Feb. 24, 1953   P. E. HAWKINS   2,629,426
SEAT MOUNTING
Filed Sept. 29, 1945    2 SHEETS—SHEET 1
FIG.1
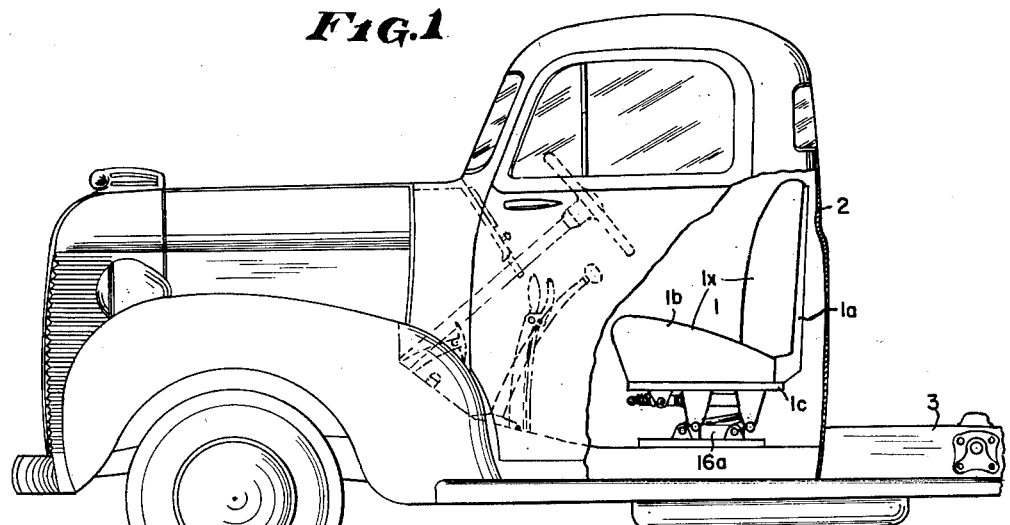
FIG.4
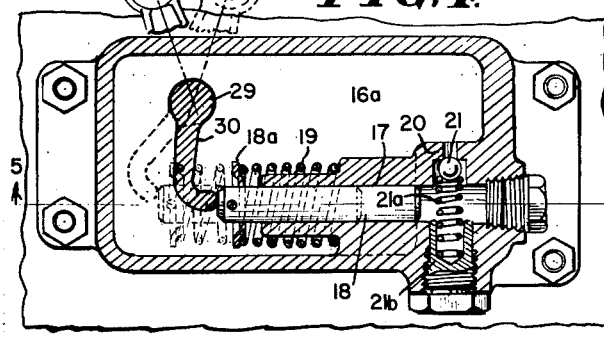
FIG.7
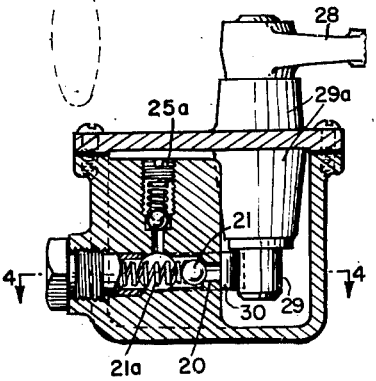
FIG.5
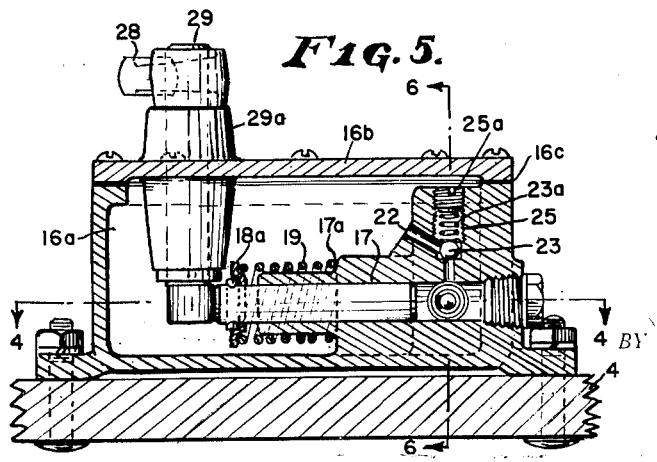
FIG.6
INVENTOR.
PAUL E. HAWKINS.
Geo. B. Pitts
ATTORNEY.

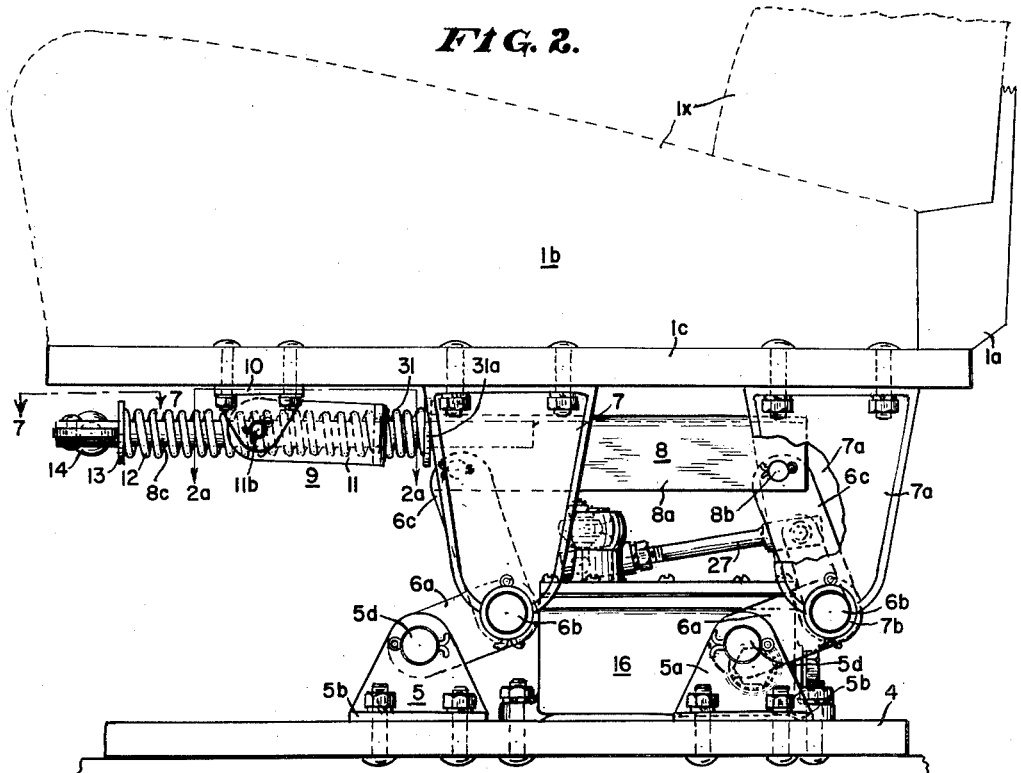
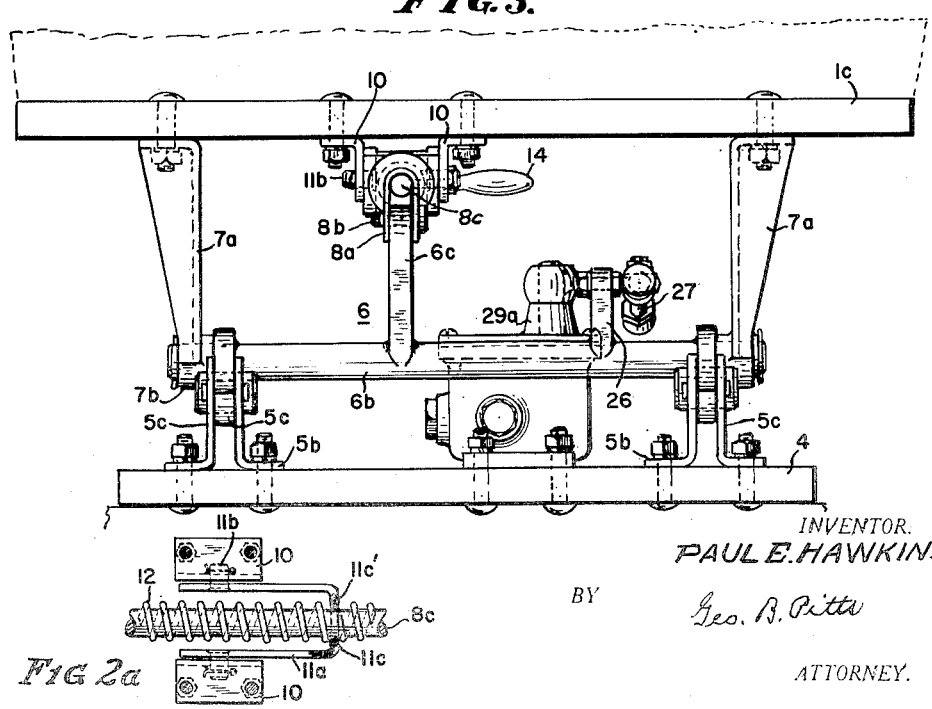

Patented Feb. 24, 1953

2,629,426

UNITED STATES PATENT OFFICE 2,629,426

SEAT MOUNTING

Paul E. Hawkins, Lakewood, Ohio, assignor, by mesne assignments, to The Euclid Road Machinery Co., Euclid, Ohio, a corporation of Ohio Application September 29, 1945, Serial No. 619,328

8 Claims. (Cl. 155—9)

This invention relates to a seat, more particularly the mounting for a seat for use in or on a wheel supported frame which may be employed for various purposes, whereby the operator or an occupant may be relieved from the effects of jolts or vibrations transmitted through the frame during travel thereof from place to place. The seat mounting as herein disclosed may be applied to vehicles of the passenger type, but is especially adapted for use on vehicles having frames mounted directly on the wheel axles as well as industrial trucks, tractors and road trucks. In these latter types of vehicles the springs which support the frames or chassis are made especially strong in view of the equipment of the vehicles or the loads to be carried thereby, so that the jolts, shocks or vibrations incident to the translation of the vehicles impart undue physical strains on the operator.

In practically all vehicles of the types referred to no provision is made between the wheel axles and chassis to absorb shocks on the latter and in most industrial trucks and tractors, the requirement to attain short wheel bases and compact assemblies of the essential units thereof precludes to a large extent the inclusion of shock absorbers, so that in these vehicles during operation the operator is subjected to shocks and vibrations, with resultant mental and physical fatigue. This condition becomes more serious or acute where the operator or other occupant puts in long hours of service, for example, in transporting goods long distances. While in some vehicles the seats for the operator are of the cushioned type, experience has demonstrated that this form of construction fails to overcome the conditions above referred to.

One object of the invention is to provide an improved seat mounting constructed to cushion the seat occupant during vehicle travel and to retard re-bound movement of the seat, whereby the occupant is relieved of jolts and undue vibrations transmitted to and through the vehicle frame.

Another object of the invention is to provide an improved seat having spring supporting means adapted to yield when the vehicle is passing over rough portions of a surface and means for retarding return movement of the supporting means under the influence of the spring.

Another object of the invention is to provide an improved combined cushioning and rebound control means for a seat, wherein the latter is supported horizontally during relative movements between the seat and vehicle frame.

Another object of the invention is to provide in a vehicle, an improved seat mounting of simplified construction for supporting an occupant, arranged to yield when the vehicle traverses a roughness in the surface and automatically to retard return movement of the seat, whereby physical strains on the occupant are materially reduced or eliminated.

Another object of the invention is to provide in a vehicle, an improved mounting for the vehicle seat consisting of spring supporting means for cushioning the seat and its occupant during vehicle travel, and a retarding means to control the return or rebound movement of the seat to prevent shocks or physical strains on the seat occupant, each of said means having an adjustment to permit control thereof independently of the other means.

Other objects of the invention will be apparent to those skilled in the art to which my invention relates from the following description taken in connection with the accompanying drawings, wherein Fig. 1 is a fragmentary side view of a truck (parts being broken away) showing a seat and a mounting therefor embodying my invention.

Fig. 2 is a fragmentary side elevation, enlarged.

Fig. 2a is a fragmentary plan view on the line 2a—2a of Fig. 2.

Fig. 3 is a fragmentary elevation looking toward the left of Fig. 2.

Fig. 4 is a section on the line 4—4 of Figs. 5 and 6.

Fig. 5 is a section on the line 5—5 of Fig. 4.

Fig. 6 is a section on the line 6—6 of Fig. 5.

Fig. 7 is a fragmentary plan view on the line 7—7 of Fig. 2.

In the drawings, 1 indicates as an entirety a seat shown for exemplifying one application of the invention in a cab or body 2 mounted on a wheel supported frame or chassis 3. The seat 1 is preferably provided with a back 1a. The seat portion 1b and its back 1a may have a width suitable for a single occupant or driver or a width capable of accommodating two or more persons. The seat portion 1b includes a base 1c, and said seat portion and the back 1a are provided with padded covers 1x.

The seat mounting consists of the following: 4 indicates a base member, which may be a part of the vehicle frame 3 or a floor board for the cab 2; but preferably consists of a separate member, whereby the seat 1 and its mounting may be fabricated as a unitary assembly ready for installing in a vehicle.

5, 5a, indicate front and rear pairs of alined standards fixed to the base member 4 and pivotally supporting the corresponding ends of front and rear parallel or registering levers 6, each consisting of a pair of arms 6a mounted on the adjacent standards, a cross member 6b and an arm 6c on the latter intermediate its opposite ends. Each standard 5, 5a, consists of a pair of spaced angles having feet 5b suitably bolted to the base member 4, the up-standing spaced portions 5c of the angles supporting the opposite ends of a pin or shaft 5d on which the adjacent arm 6a of one of the levers 6 is mounted. 7, 7a, indicate front and rear pairs of alined hangers fixed to and depending from the seat base 1c. The lower end of each hanger terminates in a knuckle or collar 7b in which the adjacent end of the cross member 6b of one of the levers 6 is rotatably mounted to swingably support the seat on the base member 4. 8 indicates a connector between and pivotally connected to the arms 6c of the levers 6 and connected to the seat base by cushioning means indicated as an entirety at 9. In the form of construction shown the connector 8 consists of an inverted U-shaped member 8a, the sides of which straddle the arms 6c and are pivotally connected thereto by pins 8b, and a rod 8c the inner end portion of which extends into and is welded to the inner walls of the U-shaped member 8a. From the foregoing description it will be observed that in any relative movement between the base member 4 and seat 1, incident to roughness in the surface over which the vehicle is traveling, the seat 1 will be maintained parallel to the member 4.

The cushioning means 9 consist of the following: 10 indicates a pair of spaced angles suitably fixed to the lower side of the seat base 1c and depending therefrom at opposite sides of the rod 8c. 11 indicates a U-shaped link the legs 11a of which are provided adjacent their outer ends with laterally extending trunnions 11b mounted in the angles 10. The end wall 11c' of the link 11 is formed with an opening 11c through which the rod 8c loosely extends to permit relative movement between it and the link during movement of the seat 1 relative to the member 4. 12 indicates a spring coiled around the rod 8c and engaging the end wall 11c' of the link 11 at one end and at its opposite end a collar 13 adjustably carried on the outer end of the rod 8c. The adjustment device for the spring 12 consists of a lever 14 pivotally mounted on the outer end of the rod 8c and having eccentric bearing surfaces disposed different distances from the pivot of the lever 14 and each arranged to engage the collar 13.

As shown, lever 14 is provided with two bearing surfaces 15, 15a. By turning the lever 14 from the dotted position (see Fig. 7) to the full line position, the tension of the spring 12 will be increased. When the parts are assembled as shown in Figs. 1, 2 and 3, the spring 12 is under slight tension and is strong enough, when adjusted, as above set forth, to support the weight of the seat and occupant.

From the foregoing description it will be observed that when relative movement takes place between the seat 1 and base member 4, one toward the other, a differential movement results between the rod 8c, which is connected to the levers 6, and the link 11, so that the spring 12 is put under tension between the end wall 11c' of the link and collar 13 and cushions the movement with respect to the inertia of the weight of the seat occupant. Relative movement between the seat 1 and member 4 in the opposite direction is retarded by a hydraulic mechanism indicated as an entirety at 16. The mechanism 16 consists of a sealed reservoir 16a for a fluid, such as oil, fixed to the member 4 and interiorly provided with a cylinder 17 in which a plunger 18 is reciprocatably mounted. The exterior wall of the cylinder 17 is provided with an annular shoulder 17a which forms a seat for the inner end of a spring 19 coiled around the outer portion of the cylinder 17. The outer end of the spring 19 engages a collar 18a fixed to the outer end portion of the plunger 18 and normally tends to move the plunger 18 endwise toward the left (as viewed in Figs. 4 and 5), as shown in dotted lines in Fig. 4. One side wall of the cylinder 17 at its inner end is formed with an intake port 20, controlled by a spring operated valve 21 (preferably a ball engaged by a spring 21a, which is held in position by a plug 21b mounted in the adjacent side wall of the reservoir 16a), so that when the plunger 18 is moved endwise as above set forth, fluid is drawn into the cylinder 17 from the reservoir 16a. 22 indicates an outlet port formed in another side wall of the cylinder 17 at its inner end, the outlet port 22 being provided with a valve seat engaged by a spring operated valve 23 (preferably a ball engaged by a spring 23a, which is mounted in a recess 25 and interposed between the ball 23 and a plug 25a threaded into the recess). As will be observed from Fig. 5, when the plunger 18 is operated endwise toward the right (as viewed in this figure), the fluid in the cylinder will be forced out through the port 22. As the port 22 has a relatively small capacity, movement of the plunger 18 will be retarded and as the plunger is operatively connected to the seat 1, preferably to one of the levers 6, as later set forth, quick rebound relative movement between the base member 4 and seat 1 is prevented, so that the retarding means 16 and cushioning means co-operate to reduce or eliminate road shocks and vibrations to the seat occupant. The connection between the seat 1 and hydraulic means 16 consists of the following: 26 indicates an arm fixed to the cross member 6b of one of the levers 6 (preferably the rear lever). The outer end of the arm 26 is pivotally connected to one end of a thrust rod 27. The opposite end of the thrust rod 27 is pivotally connected (preferably by a ball-and-socket joint) to the outer end of an arm 28 which is fixed to a rock shaft 29, the latter in turn extending through the top wall 16b of the reservoir 16a and having bearing in hollow bosses 29a provided thereon. The inner end of the rock shaft 29 is provided with an arm 30 the outer end of which engages the outer end of the plunger 18 and operates to endwise move the latter inwardly (toward the right as viewed in Figs. 4 and 5.)

When the seat is in normal position as shown in Figs. 1, 2 and 3, the thrust rod 27 through the arms 28 and 30 holds the plunger 18 inwardly, as shown in Figs. 4 and 5. When the vehicle traverses a roughness, the resulting vibration transmitted through the frame 3 effects relative movement between the member 4 and seat 1, one toward the other, so that the arms 28, 30, swing clockwise to the dotted line position as shown in Fig. 4 and the spring 19 acts on the plunger 18 to move it outwardly, whereby fluid is drawn into the cylinder 17 through the port 20. Upon relative movement between the member 4 and seat 1 in the opposite direction, the arms 28, 30, swing counter-clockwise to move the plunger 18 inwardly and force the fluid in the cylinder 17 through the port 22, the effect of which is to retard this movement and thereby prevent or eliminate a shock or jolt to the seat occupant.

31 indicates a spring coiled around the rod 8c and interposed between the end wall 11c' of the link 11 and a collar 31a suitably fixed to the rod 8c, the spring being under slight tension and serving to prevent vibration of the link and a rattle noise which might otherwise result.

As shown in Fig. 5, the spring 23a for the valve 23 is engaged by the plug 25a, so that by screwing the latter in or out of the recess 25, the tension of the spring may be varied to control the unseating of the valve 23.

The casing forming the reservoir 16a is preferably formed of integral bottom and side walls and provided with a removable top wall engaging a gasket 16c to prevent the escape of the fluid or intake of the air and other foreign matter.

It will be observed that the seat mounting is arranged entirely below the seat base 1c and that connections between the mounting and back, as well as between the back and parts of the vehicle, are eliminated, so that installation of the seat and its mounting is facilitated; also that the mounting may be employed for seats which do not have backs or seats related to a wall which forms a fixed part of the vehicle structure.

What I claim is:

1. In a seating structure, the combination with a frame and a seat, of a mounting connecting said frame and seat and comprising a pair of registering levers, pivotal connections between corresponding ends of said levers and said frame, front and rear pairs of spaced hangers fixed to and depending from said seat, each pair of hangers being pivotally mounted on one of said levers, means for cushioning the relative movement between said frame and seat, one toward the other, said cushioning means being connected to said levers and said seat, and separate means controlled by relative movement between said frame and seat, one toward the other, for retarding the relative movement in the opposite direction, said retarding means including a reservoir for liquid, a cylinder having a valved inlet leading from said reservoir, and a valved outlet leading into said reservoir, a plunger slidably fitting said cylinder, connections between a lever of said mounting and said plunger operable during movement of said mounting to move said plunger in one direction, and a spring for moving said plunger in the opposite direction, whereby movement of the plunger in said opposite direction draws fluid from said reservoir through said inlet into said cylinder and movement of the plunger in said one direction forces the fluid in said cylinder through said outlet into said reservoir.

2. In a seating structure, the combination with frame and seat members, of linkage connecting them and including a shaft pivotally mounted on one of said members and provided with two arms and an arm means, means pivotally connecting said arm means to the other of said members, cushioning means pivotally connected to one of said arms and also to one of said members, and snubbing means connecting the second of said arms to one of said members.

3. In a seating structure, the combination with frame and seat members, of linkage connecting them and including two parallel shafts pivotally mounted on one of said members, each of said shafts provided with arms and one shaft having one more arm than the other shaft, a rigid link connecting corresponding ones of the arms on the two shafts, means for pivotally connecting one arm on each shaft to the other of said members, cushioning means pivotally connected to one of said arms and also to the one member, and snubbing means connecting the extra arm on said one shaft to the other of said members.

4. In a seating structure, the combination with a frame and a seat, of front and rear levers each including a pair of arms, a cross member fixed to said arms and a separate arm on said cross member between its opposite ends, each pair of arms being pivotally mounted on said frame, front and rear pairs of hangers fixed to and depending from said seat, each pair of hangers being pivotally supported on the cross member of one of said levers, a connector pivotally connected to said separate arms and provided with an abutment, and cushioning means between said connector and said seat consisting of a member pivotally mounted at one end on said seat and provided with an end wall formed with an opening through which said connector extends, and a spring coiled around said connector and interposed between said abutment thereon and the end wall of said pivoted member.

5. In a seating structure, the combination with a base and a seat which are relatively movable vertically, and means for movably supporting said seat on said base to permit vertical relative movement therebetween, said supporting means including front and rear pairs of spaced arms swingably mounted at their lower ends on said base, pairs of hangers depending from said seat and pivotally supported on the upper ends of said pairs of arms, respectively, an upwardly extending member fixedly connected to each pair of said arms, a horizontally extending connector between and pivotally connected to said upwardly extending members and endwise movable relative to said seat during movement thereof relative to said base, an abutment carried by said connector, an abutment carried by said seat, and a compression spring interposed between said abutments.

6. In a seating structure, the combination with a frame and a seat, of a mounting connecting said frame and seat and comprising a pair of registering levers, pivotal connections between corresponding ends of said levers and said frame, front and rear pairs of spaced hangers fixed to and depending from said seat, each pair of hangers being pivotally mounted on one of said levers, means for cushioning the relative movement between said frame and seat, one toward the other, said cushioning means being connected to said levers and said seat, and separate means controlled by the relative movement between said frame and seat, one toward the other, for retarding the relative movement in the opposite direction, said retarding means including a reservoir for fluid, a cylinder having a valved inlet leading from said reservoir into said cylinder and a valved outlet leading from said cylinder into said reservoir, a plunger reciprocatably fitting said cylinder, connections between a lever of said mounting and said plunger operable during movement of said mounting to move said plunger in one direction, a spring for moving said plunger in the opposite direction, whereby movement of the plunger in said opposite direction draws fluid from said reservoir through said inlet into said cylinder and movement of said plunger in said one direction forces the fluid in said cylinder through said outlet into said reservoir, and means for adjusting the valve in said outlet.

7. In a seating structure, the combination with frame and seat members adapted for relative vertical movement, of linkage connecting them and including two two-armed levers pivotally mounted upon one of said members, cushioning means connecting the same member to one arm of each lever, the other arm of each lever being pivotally connected to the other member, and a rigid link connecting corresponding arms of the two levers so that they always turn in unison in either direction.

8. A seating structure of the character described in claim 7, in which one of said levers is provided with a third arm, and snubbing means mounted upon one of said members and connected to said third arm.

PAUL E. HAWKINS.

REFERENCES CITED

The following references are of record in the file of this patent:

UNITED STATES PATENTS

| Number | Name | Date |
| --- | --- | --- |
| 277,639 | Wenzel | May 15, 1883 |
| 399,502 | Davis | Mar. 12, 1889 |
| 613,479 | Sampson | Nov. 1, 1898 |
| 870,692 | Shepard | Nov. 12, 1907 |
| 974,194 | Schulze | Nov. 1, 1910 |
| 1,278,730 | Oliver | Sept. 10, 1918 |
| 1,875,500 | Roeder | Sept. 6, 1932 |
| 2,033,721 | Liron et al. | Mar. 10, 1936 |
| 2,432,554 | Knoedler | Dec. 16, 1947 |